(12) United States Patent
Foster et al.

(10) Patent No.: US 8,966,220 B2
(45) Date of Patent: Feb. 24, 2015

(54) OPTIMIZING LARGE PAGE PROCESSING

(71) Applicant: International Business Machines Corporation, Armonk, NY (US)

(72) Inventors: Alfred F. Foster, Wappingers Falls, NY (US); David Horn, Poughkeepsie, NY (US); Charles E. Mari, Wappingers Falls, NY (US); Matthew J. Mauriello, Fishkill, NY (US); Robert Miller, Jr., Poughkeepsie, NY (US); Mariama Ndoye, Poughkeepsie, NY (US); Scott B. Tuttle, Staatsburg, NY (US); Elpida Tzortzatos, Lagrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 215 days.

(21) Appl. No.: 13/741,596

(22) Filed: Jan. 15, 2013

(65) Prior Publication Data

US 2014/0201493 A1 Jul. 17, 2014

(51) Int. Cl.
*G06F 12/10* (2006.01)

(52) U.S. Cl.
CPC .................................. *G06F 12/1009* (2013.01)
USPC .......................................................... 711/206

(58) Field of Classification Search
None
See application file for complete search history.

(56) References Cited

U.S. PATENT DOCUMENTS

| 4,730,249 | A | 3/1988 | O'Quin, II et al. |
| 7,516,297 | B2 | 4/2009 | Mather |
| 8,078,636 | B2 | 12/2011 | Layden et al. |
| 2010/0275193 | A1* | 10/2010 | Hansen .......................... 717/151 |
| 2011/0004739 | A1 | 1/2011 | Hohmuth et al. |
| 2011/0302388 | A1 | 12/2011 | Reynya et al. |

* cited by examiner

*Primary Examiner* — Duc Doan
(74) *Attorney, Agent, or Firm* — Cantor Colburn LLP; William A. Kinnaman, Jr.

(57) ABSTRACT

Embodiments of the disclosure include a method for optimizing large page processing. The method includes receiving an indication that a real memory includes a first page. The first page includes a plurality of smaller pages. The method also includes determining a page frame table entry associated with a first smaller page of the first page and storing data associated with the first page in the page frame table entry associated with the first smaller page. The page frame table entry associated with the first smaller page of the first page is a data repository for the plurality of smaller pages of the first page.

18 Claims, 6 Drawing Sheets

OPTIMIZING LARGE PAGE PROCESSING

BACKGROUND

The present disclosure relates to the management of real storage, and more specifically, to optimizing processing of large pages.

Many computer systems support the storage of large pages, such as pages larger than 1 megabyte (MB). One of the benefits of using large pages for storage is that performance can be improved by avoiding the substantial overhead of managing pages at a 4 kilobyte (KB) level. To the operating system, 1 MB pages are simply 256 contiguous 4 KB pages. Recently, computer systems have been developed that support the storage of even larger pages, such as 2 gigabyte (GB) pages. Similar to the 1 MB pages, the 2 GB pages are simply 524,288 contiguous 4 KB pages.

However, there are performance problems inherent with processing pages larger than 4 KB for the operating system. For example, even though the applications may see large pages as one 2 GB page, at least a portion of the operating system treats the 2 GB page as 524,288 individual 4 KB pages that are each represented by a single page frame table entry (PFTE). Functions of the operating system that need to scan real memory (done 4 KB pages at a time) or priming a 2 GB page for use will result in loop iterations of more than a half a million of these PFTEs. These loop iterations can happen while holding essential locks which means the performance implications are not just the duration of the loop, but the duration of the loop while holding locks. As even larger pages are introduced in the future, the number of contiguous 4 KB pages to iterate increases which equates to much longer loop iterations while holding essential locks.

SUMMARY

According to an exemplary embodiment, a method for optimizing large page processing, the method includes receiving, by a processor, an indication that a real memory comprises a first page, wherein the first page having a plurality of smaller pages. The method also includes determining a page frame table entry associated with a first smaller page of the first page and storing data associated with the first page in the page frame table entry associated with the first smaller page. The page frame table entry associated with the first smaller page of the first page is a data repository for the plurality of smaller pages of the first page.

According to another exemplary embodiment, a computer program product for optimizing large page processing, the computer program product includes a tangible storage medium readable by a processing circuit and storing instructions for execution by the processing circuit for performing a method. The method includes receiving, by a processor, an indication that a real memory comprises a first page, wherein the first page having a plurality of smaller pages. The method also includes determining a page frame table entry associated with a first smaller page of the first page and storing data associated with the first page in the page frame table entry associated with the first smaller page. The page frame table entry associated with the first smaller page of the first page is a data repository for the plurality of smaller pages of the first page.

According to another exemplary embodiment, a method for scanning a real memory including a first page, the method includes determining, by a processor, if an address associated with a current page frame table entry (PFTE) is associated with the first page. Based on determining that the address associated with the current PFTE is associated with the first page, the method includes skipping to a first PFTE after a last PFTE of the first page. Based on determining that the address associated with the current PFTE is not associated with the first page, the method also includes determining if a page associated with the current PFTE is eligible to be stolen. Based on determining that the page associated with the current PFTE is not eligible to be stolen, the method further includes skipping to a next PFTE.

Additional features and advantages are realized through the techniques of the present disclosure. Other embodiments and aspects of the disclosure are described in detail herein and are considered a part of the claimed disclosure. For a better understanding of the disclosure with the advantages and the features, refer to the description and to the drawings.

BRIEF DESCRIPTION OF THE SEVERAL VIEWS OF THE DRAWINGS

The subject matter which is regarded as the embodiments are particularly pointed out and distinctly claimed in the claims at the conclusion of the specification. The forgoing and other features, and advantages of the disclosure are apparent from the following detailed description taken in conjunction with the accompanying drawings in which:

DETAILED DESCRIPTION

Figure 1:
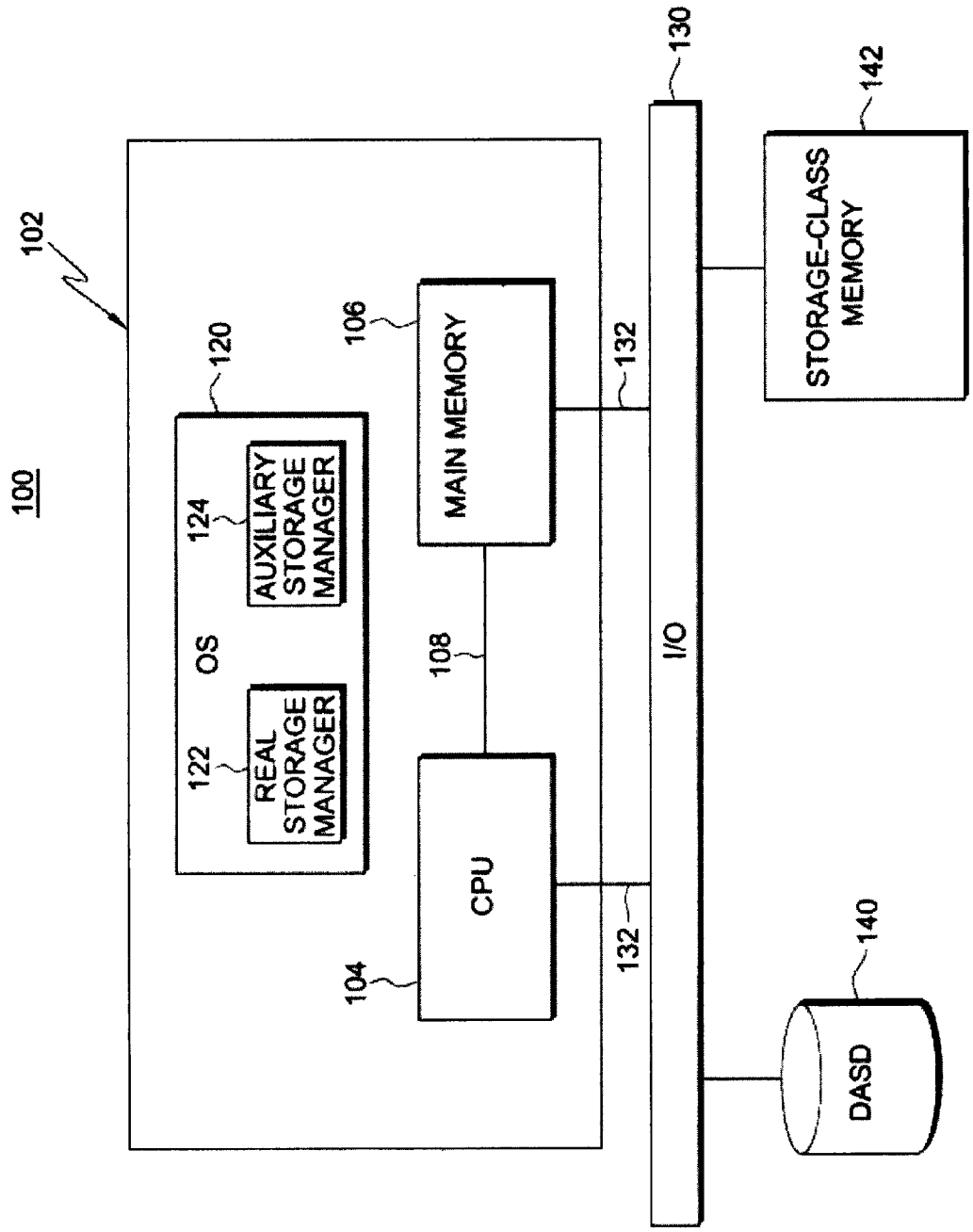
FIG. 1 is a block diagram illustrating one example of a processing system for practice of the teachings herein.

Referring now to FIG. 1, an embodiment of a computing environment to incorporate and/or use one or more aspects of the present disclosure is shown. In exemplary embodiments, computing environment 100 includes a system 102, such as one or more servers, a central processing complex, etc., that includes, for instance, one or more central processing units (CPUs) 104 coupled to main memory 106 via one or more buses 108. One of the central processing units 104 may execute an operating system 120, such as the z/OS® operating system offered by International Business Machines Corporation. In other examples, one or more of the central processing units may execute other operating systems or no operating system. z/OS® is a registered trademark of International Business Machines Corporation, Armonk, N.Y., USA.

Central processing unit(s) 104 and main memory 106 are further coupled to an I/O subsystem 130 via one or more connections 132 (e.g., buses or other connections). The I/O subsystem 130 provides connectivity to one or more auxiliary storage media, including, for instance, one or more direct access storage devices (DASD) 140 and storage class memory 142 (e.g., flash memory). In one particular example of the z/Architecture®, the I/O subsystem 130 is a channel subsystem. However, the I/O subsystem 130 may be a subsystem other than a channel subsystem, and the auxiliary storage media may be media other than or in addition to DASD 140 and storage class memory 142.

Main memory 106 and auxiliary storage are managed, in one example, by managers of operating system 120, including, for instance, a real storage manager 122 and an auxiliary storage manager 124. Real storage manager 122 is responsible for tracking the contents of main memory 106 and managing the paging activities of main memory. Auxiliary storage manager 124 is responsible for tracking auxiliary storage, including DASD 140 and storage class memory 142, and for working with the real storage manager 122 to find locations to store pages that are being evicted from main memory 106.

The auxiliary storage manager 124 manages various types of auxiliary storage, including storage class memory 142, such as flash memory. In one embodiment, storage class memory 142 is read or written in varying storage block sizes, including 4 KB and 1M storage blocks, as examples. The operating system (e.g., auxiliary storage manager 124) keeps track of the blocks currently being used and by which system component. In exemplary embodiments, large pages (e.g., 1 MB or larger) include a plurality of contiguous (e.g., 256 for a 1 MB page) 4 KB pages, and each 4 KB page has associated therewith a PFTE. Within each PFTE is an identifier that specifies the type of page, e.g., a 4 K page, a 1 MB page or a 2 GB page.

In exemplary embodiments, the performance of an operating system when processing a 2 GB page can be improved by treating the 2 GB page as a single logical page, rather than a collection of 524,288 4 KB pages. In exemplary embodiments, the operating system will only manage the first PFTE of a 2 GB page rather than 524,288 individual PFTEs. Accordingly, the operating system will no longer reference or change any other PFTE that makes up the 2 GB page except for the first one. In exemplary embodiments, more than a half million loop iterations that are currently required to allocate and free a 2 GB page can be eliminated by using a single PFTE for a 2 GB page. In addition, the essential locks will be held for a substantially shorter period of time, thereby allowing other processes that require the same locks to run sooner. Furthermore, real memory scans will run faster if only the first PFTE of a 2 GB page is checked.

Currently, when a large page is processed, whether to allocate or free it, the operating system updates all PFTEs that make up the large page. For example, a 1 MB page consists of 256 4 KB pages that are each updated during allocation or freeing of the 1 MB page. In addition, depending upon the operation the processor may have to execute multiple instructions on each of the pages to complete the requested operation.

Figure 2:
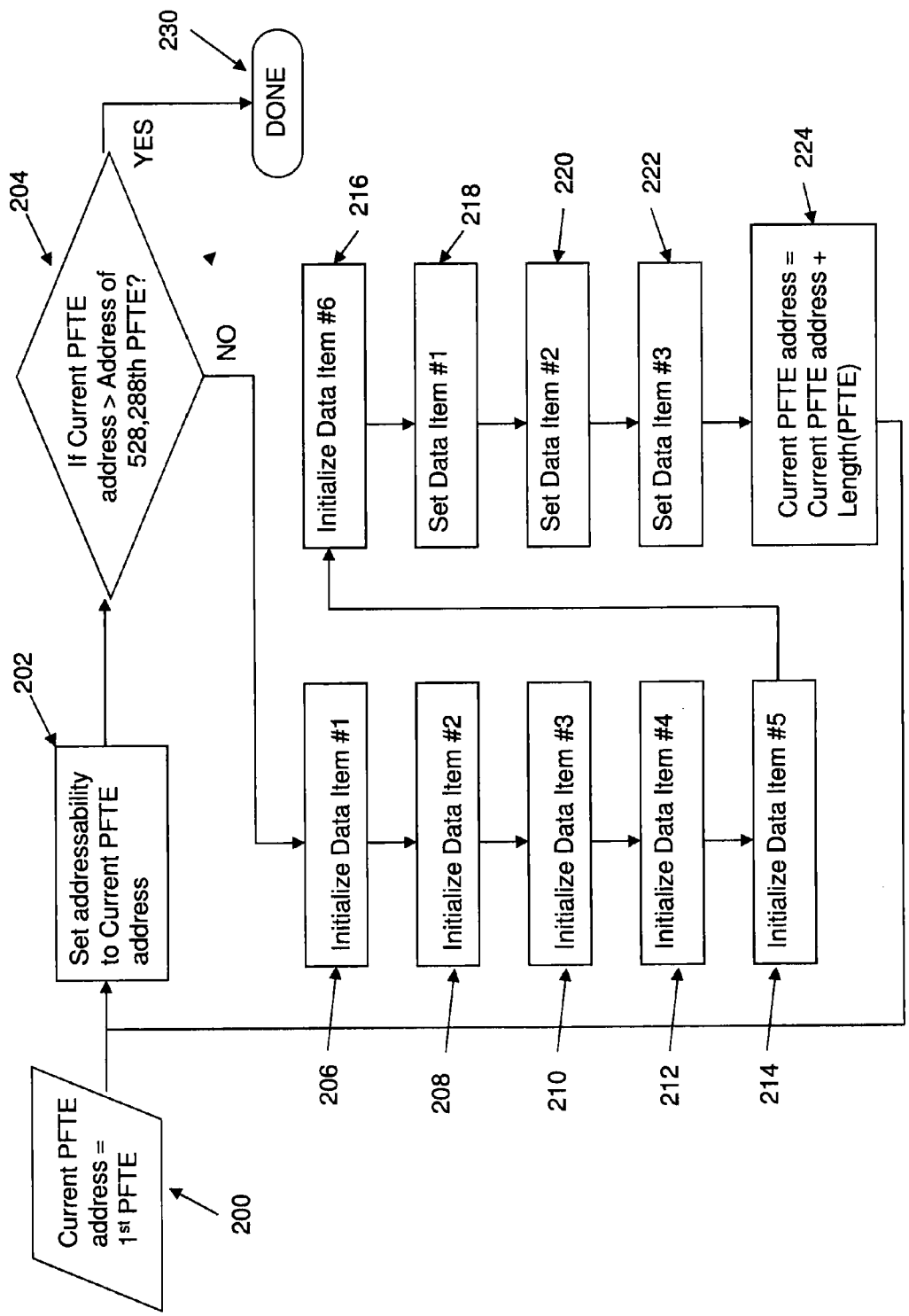
FIG. 2 is flowchart diagram illustrating a method of allocating a 2 GB page.

Referring now FIG. 2 a flowchart diagram illustrating a method of page allocation of a 2 GB page that is treated as a collection of 524,288 4 KB pages is shown. As illustrated at block 200, the method begins by setting the current PFTE address to the address of the first PFTE of the 2 GB page. Next, as shown at block 202, the method includes setting the addressability to the current PFTE address. As shown at decision block 204, the method includes determining if the current PFTE address is greater than the 528,288 PFTE, or the last PFTE of the 2 GB page. If the current PFTE address is greater than the 528,288 PFTE, the method proceeds to block 230 and concludes. Otherwise, the method includes initializing data item #1-6, as shown at blocks 206, 208, 210, 212, 214 and 216 respectively. In exemplary embodiments, during allocation of the page, at least six data items in each PFTE are initialized to zeroes to ensure information about the previous requester of this page is not carried forward. The method then continues by setting data items #1-3, as shown at blocks 218, 220, and 222 respectively. In exemplary embodiments, at least three data items in each PFTE are set to information associated with the requester. Next, as shown at block 224, the method includes incrementing the current PFTE address to the next PFTE. As illustrated, during the allocation of a 2 GB page that is treated as a collection of 524,288 4 KB pages the processor must execute at least ten instructions for each PFTE. Accordingly, in order to allocate a 2 GB page, the processor must execute at least 5,242,880 instructions.

During pre-allocation, the operating system executes at least three instructions to set data items in the PFTE to information associated with the requester. Currently, in order to pre-allocate a 2 GB page that is treated as a collection of 524,288 4 KB pages the operating system must execute at least 1,572,864 instructions. When the operating system frees a page, the data items in the PFTE are not initialized because the information is used for diagnostics in the event of a system failure. Accordingly, the operating system must execute one instruction for each PFTE to free the page. Currently, in order to free a 2 GB page that is treated as a collection of 524,288 4 KB pages the operating system must execute at least 524,288 instructions.

In exemplary embodiments, the operating system manages the 2 GB pages using a single PFTE associated with each 2 GB page. The operating system only writes to PFTEs that are the first PFTE of a 2 GB page during 2 GB page processing. In exemplary embodiments, the first PFTE of a 2 GB page is the data repository for all PFTEs that make up the 2 GB page. If the operating system needs to extract data associated with a non-first PFTE of a 2 GB page, it does so by using the information in the first PFTE plus indexing to determine what the data should be. In exemplary embodiments, except for one data item, the PFTE is initialized or set to the same value whether it is the first PFTE or the last PFTE of a 2 GB page.

Figure 3:
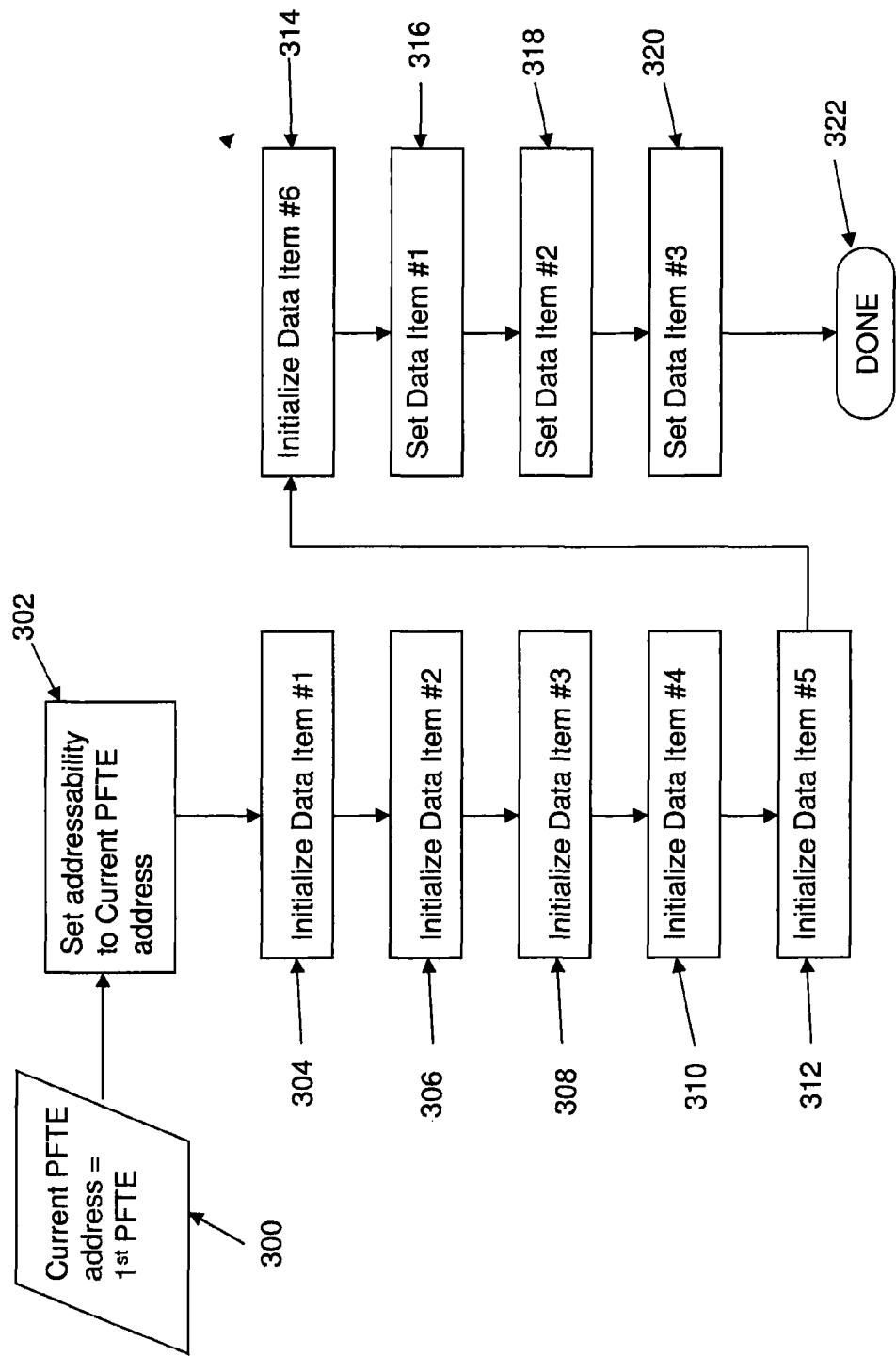
FIG. 3 is flowchart diagram illustrating a method of allocating a 2 GB page in accordance with an exemplary embodiment.

Referring now FIG. 3, a flowchart diagram illustrating a method of page allocation of a 2 GB page in accordance with an exemplary embodiment is shown. As illustrated at block 300, the method begins by setting the current PFTE address to the address of the first PFTE of the 2 GB page. Next, as shown at block 302, the method includes setting the addressability to the current PFTE address. Next, the method includes initializing data item #1-6, as shown at blocks 304, 306, 308, 310, 312 and 314 respectively. In exemplary embodiments, during allocation of the page, at least six data items in each PFTE are initialized to zeroes to ensure information about the previous requester of this page is not carried forward. The method then continues by setting data items #1-3, as shown at blocks 316, 318 and 320 respectively. In exemplary embodiments, at least three data items in each PFTE are set to information associated with the requester. Next, as shown at block 322, the method concludes. As illustrated, during the allocation of a 2 GB page the processor must execute at least ten instructions for only a single PFTE. Accordingly, in exemplary embodiments, an entire 2 GB page may be allocated by the processor by executing only 10 instructions.

In exemplary embodiments, all 2 GB pages reside on a 2 GB boundary in real storage. For example, a 2 GB page can start at real storage address 4 G, 6 G, 8 G, etc., but it may not start at real storage 5 G. The PFTE that corresponds to a 2 GB page can be obtained by dividing the real storage address by 64 (or 40 hex). Conversely, the real storage address corresponding to a PFTE can be determined by multiplying the real storage location of the PFTE by 64 (or 40 hex). In exemplary embodiments, except for the first PFTE data which contains the associated virtual storage address, all other data items should have the same value whether it is the first PFTE or last PFTE of a 2 GB page.

In exemplary embodiments, the address of a first PFTE of a 2 GB page can be determined by masking the address of any PFTE of a 2 GB page by the hex value 'FFFFFFFFFE000000'. For example, a system may have 8 gigabytes of real storage including two 2 GB pages starting at 4G and 6G, which map to virtual storage address 50 G and 52 G respectively. The first PFTE of the 2 GB page can be obtained by performing a mask on any of the non-first PFTEs. After applying the mask, the resulting address of the first PFTE can be used to extract the desired data, since only the first PFTE of a 2 GB page has data.

Figure 4:
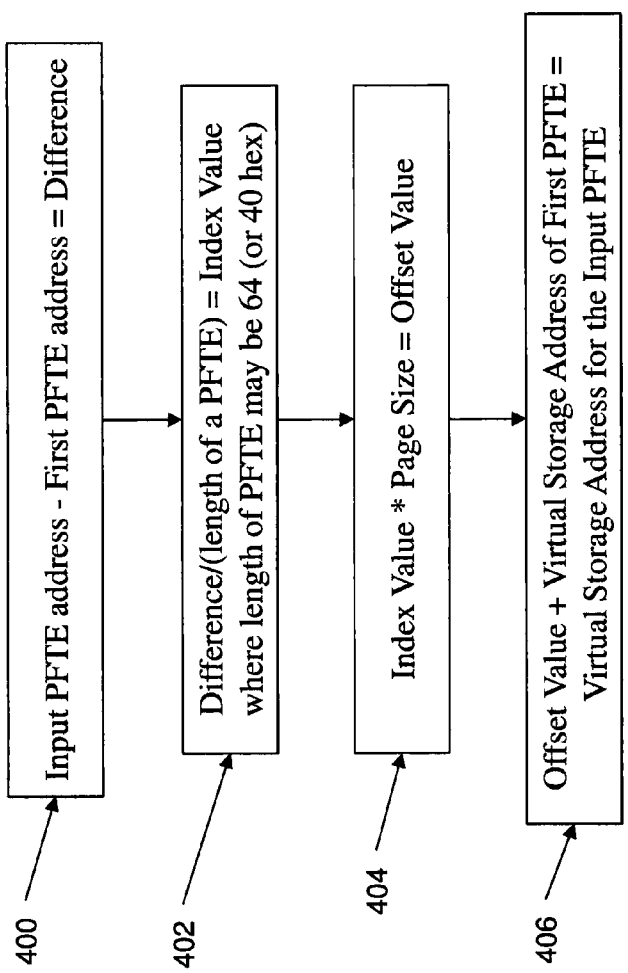
FIG. 4 is a flowchart diagram illustrating a method for obtaining a virtual storage address associated with a given PFTE in accordance with an exemplary embodiment.

To obtain the virtual storage address associated with a given PFTE, the index of the given PFTE can be used to calculate the true virtual storage address. Referring now to FIG. 4, a flowchart illustrating a method for obtaining the virtual storage address associated with a given PFTE in accordance with an exemplary embodiment is shown. As shown at block 400, the difference of the input PFTE address and the first PFTE address is calculated. Next, as shown at block 402, the difference is divided by 64 (or 40 hex) to get an index value. Then, as shown at block 404, the index value is multiplied by the size of a page to get an offset value. For example 4096 (or 1000 hex), which is the size of a 4 KB page. Next, as shown at block 406, the offset value is added to the virtual storage address stored in the first PFTE to determine the proper virtual storage address for the input PFTE.

In exemplary embodiments, by using a single PFTE for a 2 GB page the performance of scanning real memory can be improved. During scanning, the operating system scans each PFTE until it can find one that can be stolen to satisfy the outstanding page request. Since 2 GB pages are ineligible to be stolen, the scan is unnecessarily interrogating 524,287 PFTEs that are always ineligible. Accordingly, in exemplary embodiments the operating system will first determine if the scanned PFTE is associated with a 2 GB page and, if so, it will skip to the PFTE immediately after the last PFTE associated with this 2 GB page. As a result the real memory scan time for systems that have defined 2 GB pages is reduced.

Figure 5:
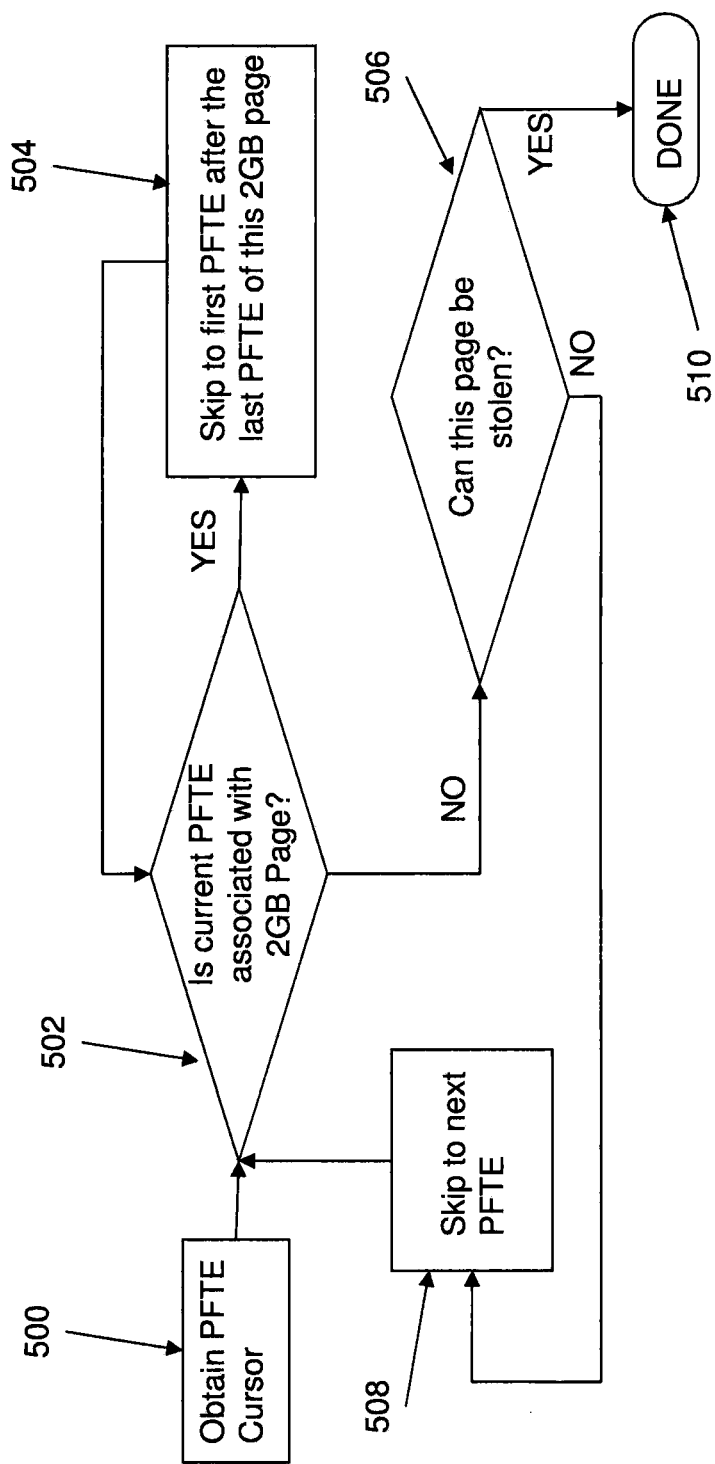
FIG. 5 is a flowchart diagram illustrating a method for scanning a real memory including two gigabyte pages in accordance with an exemplary embodiment.

Referring now to FIG. 5, a flowchart illustrating a method for scanning real memory including 2 GB pages in accordance with an exemplary embodiment is shown. As illustrated, the method begins at block 500 by obtaining a PFTE cursor. In exemplary embodiments, the PFTE cursor is the address of the last PFTE that was scanned. The PFTE cursor may be used to track the last 4 KB page that was stolen when scanning for 4 KB pages to steal. Next, as shown at decision block 502, the method includes determining if the current PFTE is associated with a 2 GB page. If the current PFTE is associated with a 2 GB page, the method proceeds to block 504 and skips to first PFTE after the last PFTE of the associated 2 GB page. If the current PFTE is not associated with a 2 GB page, the method proceeds to decision block 506 and determines if the page associated with the current PFTE can be stolen. If the page associated with the current PFTE can be stolen, the method concludes as shown at block 510. Otherwise, the method proceeds to block 508 and skips to the next PFTE.

Figure 6:
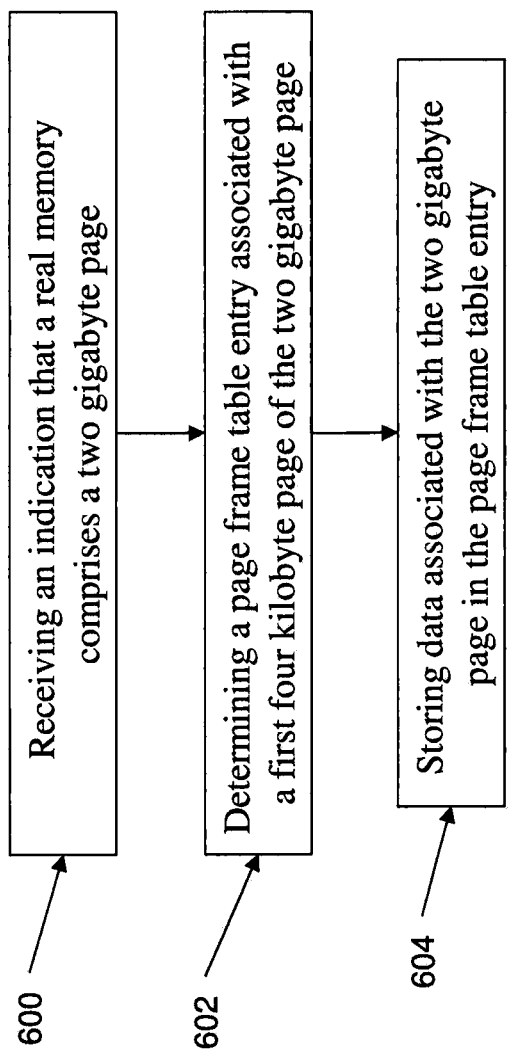
FIG. 6 is a flowchart diagram illustrating a method for large page processing in accordance with an exemplary embodiment.

Referring now to FIG. 6, a flowchart diagram illustrating a method for large page processing in accordance with an exemplary embodiment is shown. As shown at block 600, the method includes receiving an indication that a real memory includes a two gigabyte page. In exemplary embodiments, the two gigabyte page includes a plurality of four kilobyte pages. Next, as shown at block 602, the method includes determining a page frame table entry associated with a first four kilobyte page of the two gigabyte page. As shown at block 604, the method also includes storing data associated with the two gigabyte page in the page frame table entry. In exemplary embodiments, only the page frame table entry associated with the first four kilobyte page of the two gigabyte page contains data associated with the two gigabyte page.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flow diagrams depicted herein are just one example. There may be many variations to this diagram or the steps (or operations) described therein without departing from the spirit of the disclosure. For instance, the steps may be performed in a differing order or steps may be added, deleted or modified. All of these variations are considered a part of the claimed disclosure.

While exemplary embodiments of the invention have been described, it will be understood that those skilled in the art, both now and in the future, may make various improvements and enhancements which fall within the scope of the claims which follow. These claims should be construed to maintain the proper protection for the disclosure first described.

What is claimed is:

1. A method for optimizing large page processing, the method comprising:
    receiving, by a processor, an indication that a real memory comprises a first page, wherein the first page comprises a plurality of smaller pages;
    determining a page frame table entry associated with a first smaller page of the first page; and
    storing data associated with the first page in the page frame table entry associated with the first smaller page;
    wherein the page frame table entry associated with the first smaller page of the first page is a data repository for the plurality of smaller pages of the first page.

2. The method of claim 1, wherein the first page is a two gigabyte page and each of the plurality of smaller pages is a four kilobyte page.

3. The method of claim 1, wherein each of the plurality of smaller pages includes an associated page frame table entry that includes an associated virtual storage address.

4. The method of claim 3, wherein each of the plurality of page frame table entries further comprises a plurality of data items and wherein the data items of the plurality of page frame table entries are identical.

5. The method of claim 1, wherein the first page resides on a two gigabyte boundary in real storage.

6. The method of claim 1, further comprising:
    receiving a request to extract a data item associated with a page frame table entry associated with a non-first smaller page of the first page;
    obtaining an address of the page frame table entry associated with the first smaller page of the first page by masking a received address of the page frame table entry associated with the non-first smaller page with a predetermined value; and
    extracting the data item from the page frame table entry associated with the first smaller page of the first page.

7. The method of claim 6, wherein the first page is a two gigabyte page and the predetermined value is FFFFFFFFFE000000.

8. A computer program product for optimizing large page processing, the computer program product comprising:
   a tangible storage medium readable by a processing circuit and storing instructions for execution by the processing circuit for performing a method comprising:
   receiving an indication that a real memory comprises a first page, wherein the first page comprises a plurality of smaller pages;
   determining a page frame table entry associated with a first smaller page of the first page; and
   storing data associated with the first page in the page frame table entry associated with the first smaller page;
   wherein the page frame table entry associated with the first smaller page of the first page is a data repository for the plurality of smaller pages of the first page.

9. The computer program product of claim 8, wherein the first page is a two gigabyte page and each of the plurality of smaller pages is a four kilobyte page.

10. The computer program product of claim 8, wherein each of the plurality of smaller pages includes an associated page frame table entry that includes an associated virtual storage address.

11. The computer program product of claim 10, wherein each of the plurality of page frame table entries further comprises a plurality of data items and wherein the data items of the plurality of page frame table entries are identical.

12. The computer program product of claim 8, wherein the first page is a two gigabyte page and the first page resides on a two gigabyte boundary in real storage.

13. The computer program product of claim 8, further comprising:
   receiving a request to extract a data item associated with a page frame table entry associated with a non-first smaller page of the first page;
   obtaining an address of the page frame table entry associated with the first smaller page of the first page by masking a received address of the page frame table entry associated with the non-first smaller page with a predetermined value; and
   extracting the data item from the page frame table entry associated with the first smaller page of the first page.

14. The computer program product of claim 13, wherein the first page is a two gigabyte page and the predetermined value is FFFFFFFFFE000000.

15. A method for scanning a real memory including a first page, the method comprising:
   determining, by a processor, if an address associated with a current page frame table entry (PFTE) is associated with the first page;
   based on determining that the address associated with the current PFTE is associated with the first page, skipping to a first PFTE after a last PFTE of the first page;
   based on determining that the address associated with the current PFTE is not associated with the first page, determining if a page associated with the current PFTE is eligible to be stolen; and
   based on determining that the page associated with the current PFTE is not eligible to be stolen, skipping to a next PFTE.

16. The method of claim 15, wherein the first page is a two gigabyte page and each of the plurality of smaller pages is a four kilobyte page.

17. The method of claim 15, further comprising:
   maintaining a PFTE cursor, wherein the PFTE cursor is an address associated with the PFTE of a last page stolen.

18. The method of claim 15, further comprising:
   setting the address associated with the current PFTE to the PFTE cursor prior to determining if the address associated with the current PFTE is associated with the first page.

* * * * *